(12) United States Patent
Hutchins

(10) Patent No.: US 9,790,840 B2
(45) Date of Patent: Oct. 17, 2017

(54) FLUID FLOW CONTROL DEVICE AND METHOD

(71) Applicant: JAGUAR LAND ROVER LIMITED, Warwickshire (GB)

(72) Inventor: William Hutchins, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 344 days.

(21) Appl. No.: 14/404,320

(22) PCT Filed: May 31, 2013

(86) PCT No.: PCT/EP2013/061291
§ 371 (c)(1),
(2) Date: Nov. 26, 2014

(87) PCT Pub. No.: WO2013/178799
PCT Pub. Date: Dec. 5, 2013

(65) Prior Publication Data
US 2015/0176471 A1 Jun. 25, 2015

(30) Foreign Application Priority Data
May 31, 2012 (GB) .................................. 1209679.8

(51) Int. Cl.
*F01P 7/16* (2006.01)
*G05D 23/19* (2006.01)
(Continued)

(52) U.S. Cl.
CPC *F01P 7/16* (2013.01); *F01P 3/02* (2013.01); *F01P 7/164* (2013.01); *F01P 7/165* (2013.01);
(Continued)

(58) Field of Classification Search
CPC .... F01P 7/16; F01P 7/165; F01P 7/167; F01P 2003/027; F01P 2060/08; G05D 23/022; G05D 23/30
See application file for complete search history.

(56) References Cited

U.S. PATENT DOCUMENTS 4,370,950 A 2/1983 Furukubo
4,410,133 A 10/1983 Furukubo
(Continued)

FOREIGN PATENT DOCUMENTS

DE 20122547 U1 4/2006
DE 102008007766 A1 8/2009
(Continued)

OTHER PUBLICATIONS

International Search Report for International application No. PCT/EP2013/061289 dated Aug. 28, 2013.
(Continued)

*Primary Examiner* — Jonathan Bradford
(74) *Attorney, Agent, or Firm* — Carlson, Gaskey & Olds

(57) ABSTRACT

A fluid flow control device controls flow of coolant in a motor vehicle motor cooling system. The flow control device includes first and second coolant inlets and first and second coolant outlets. The flow control device is operable selectively to direct coolant flowing into the device to flow out from the flow device through one or both of the first and second outlets in dependence on a temperature of fluid flowing through the device.

16 Claims, 11 Drawing Sheets

(51) Int. Cl.
  *G05D 23/30* (2006.01)
  *G05D 23/02* (2006.01)
  *F01P 3/02* (2006.01)
  *F01P 7/14* (2006.01)

(52) U.S. Cl.
  CPC ....... *G05D 23/021* (2013.01); *G05D 23/1917* (2013.01); *F01P 2003/027* (2013.01); *F01P 2007/146* (2013.01); *F01P 2025/13* (2013.01); *F01P 2025/32* (2013.01); *F01P 2025/40* (2013.01); *F01P 2025/46* (2013.01); *F01P 2025/62* (2013.01); *F01P 2025/64* (2013.01); *F01P 2050/24* (2013.01); *F01P 2060/04* (2013.01); *F01P 2060/08* (2013.01); *F01P 2060/12* (2013.01); *F01P 2060/16* (2013.01); *F01P 2070/04* (2013.01); *G05D 23/022* (2013.01); *G05D 23/30* (2013.01); *Y10T 137/0324* (2015.04); *Y10T 137/87249* (2015.04)

(56) References Cited

U.S. PATENT DOCUMENTS

| | | | |
|---|---|---|---|
| 4,539,942 A * | 9/1985 | Kobayashi | F01P 7/08 123/41.1 |
| 4,748,941 A | 6/1988 | Kashiwase | |
| 6,109,218 A | 8/2000 | Bachschmid et al. | |
| 6,607,142 B1 | 8/2003 | Boggs et al. | |
| 6,843,211 B2 | 1/2005 | Iwasaki | |
| 6,899,162 B2 | 5/2005 | Hohl et al. | |
| 2003/0217707 A1 | 11/2003 | Iwasaki | |
| 2004/0050544 A1 | 3/2004 | Hohl et al. | |
| 2008/0308049 A1 | 12/2008 | Komurian et al. | |

FOREIGN PATENT DOCUMENTS

| | | |
|---|---|---|
| EP | 1308609 A1 | 5/2003 |
| EP | 2096276 a1 | 9/2009 |
| FR | 2849673 A1 | 7/2004 |
| FR | 2934319 A1 | 1/2010 |
| GB | 2164740 A | 3/1986 |
| WO | 2007128123 A1 | 11/2007 |
| WO | 2008029029 A1 | 3/2008 |
| WO | 2009113366 A1 | 9/2009 |

OTHER PUBLICATIONS

Combined Search and Examination Report for Application No. GB1309736.5 dated Jan. 16, 2014.
Combined Search and Examination Report for Application No. GB1309738.1 dated Jan. 28, 2014.
International Search Report for International application No. PCT/EP2013/061291 dated Jul. 17, 2013.

* cited by examiner

FLUID FLOW CONTROL DEVICE AND METHOD

CROSS REFERENCE TO RELATED APPLICATION

This application claims priority from UK Patent Application No. GB1209679.8, filed 31 May 2012, the entire contents of which are expressly incorporated by reference herein.

TECHNICAL FIELD

The present invention relates to an apparatus for controlling fluid flow in an engine coolant system. In particular but not exclusively the invention relates to engine coolant flow control in motor vehicles.

BACKGROUND

It is known to provide an engine cooling apparatus for cooling an engine of a motor vehicle. FIG. 1 is a schematic diagram of a known coolant circuit 101 connected to an engine 120. The apparatus has an engine driven fluid pump 122 arranged to pump coolant through a cylinder head 120H of the engine 120 and optionally through a cylinder block 120B of the engine 120 depending on the state of a cylinder block flow valve BV. The block flow valve BV is provided at an outlet of the cylinder block 120B. The block flow valve BV is arranged to open when a temperature of a portion of the block flow valve BV exceeds a prescribed value, allowing coolant to flow through the block 120B.

A further valve (sometimes referred to as a 'top valve', 'top thermostat' or 'top stat') TV is provided for selectively diverting coolant that has passed through the cylinder head 120H (and cylinder block 120B if the block valve BV is open) through a radiator bypass conduit 128 and/or a radiator conduit 126C. The radiator conduit 126C is coupled to a radiator 126. The top valve TV is provided upstream of the radiator 126, directing coolant flowing out from the engine 120 down one or both of the radiator conduit 126C and bypass conduit 128.

When coolant flowing through the top valve TV is relatively cold, the coolant is directed to flow through the radiator bypass conduit 128 and not the radiator conduit 126C. Above a first (lower) critical coolant temperature, the top valve begins to 'open', allowing coolant to flow through the radiator conduit 126C as well as the radiator bypass conduit 128. Above a second (higher) critical coolant temperature that is greater than the first critical coolant temperature the top valve TV fully opens, closing the radiator bypass conduit 128 and directing coolant solely through the radiator conduit 126C.

It is to be understood that opening of the top valve TV and opening of the block flow valve BV is controlled by different respective actuators responsive to the temperature of coolant flowing through the respective valves TV, BV. As noted above, the block valve BV is located immediately downstream of the cylinder block 120B such that only water flowing through the block 120B can flow through the block valve BV. The top valve TV is located downstream of the block valve BV and cylinder head 120H such that coolant flowing through the cylinder head 120H or cylinder block 120B flows through the top valve TV.

The present applicant has recognised that the above described known arrangement suffers from at least two problems. Firstly, the arrangement suffers from the problem of oscillations in the state of the top valve TV as the engine warms. This is because once the temperature of coolant flowing through the bypass conduit 128 reaches the first critical coolant temperature, the top valve allows coolant to flow through the radiator 126 and the bypass conduit 128, effectively splitting the flow of coolant between the radiator 126 and bypass conduit 128. Relatively cold water from the radiator 126 therefore flows through the top valve TV, causing a drop in temperature of the top valve TV. The top valve TV responds by reducing the amount of coolant flow through the radiator 126. Frequently, the top valve TV responds by substantially stopping flow of coolant through the radiator 126. The top valve TV subsequently warms due to the flow of relatively hot coolant through the bypass conduit 128, causing the top valve TV to open again, allowing coolant to flow through the radiator 126. It is to be understood that this process of opening and closing the top valve TV may continue until the temperature of coolant flowing out from the radiator 126 has warmed sufficiently to stabilise top valve operation.

A second problem associated with the arrangement of FIG. 1 is that if the block valve BV opens whilst oscillations in coolant temperature are occurring (due to oscillation of the state of the top valve TV), the engine block 120B will be subject to coolant temperature oscillations, subjecting the block 120B to thermal shocks which may have a deleterious effect on engine performance and service life.

It is an aim of embodiments of the present invention to at least partially mitigate the disadvantages of known engine coolant systems.

SUMMARY

According to an aspect of the invention there is provided a fluid flow control device for controlling flow of coolant in a motor vehicle motor cooling system, the flow control device having first and second coolant inlets and first and second coolant outlets, the flow control device being operable selectively to direct coolant flowing into the device to flow out from the flow device through one or both of the first and second outlets in dependence on a temperature of fluid flowing through the device.

Embodiments of the invention may control fluid flowing into the device through the second inlet coordinated with selection of the outlet from which the fluid flows out from the device.

The temperature of fluid flowing through the device may be determined by measuring a temperature of fluid at a location that is in a flowpath of fluid through the device but that is upstream or downstream of the device, as well as a location that is within the device itself.

Embodiments of a motor cooling system may be a system for conveying coolant in a looped path for cooling one or more motors or actuators of the vehicle.

The flow control device may be further operable selectively to allow or to prevent flow of coolant into the device through the second inlet in dependence on the temperature of the fluid flowing through the device.

Outlet valve means may be provided for selectively directing fluid flowing into the device through the first outlet only, through both the first and second outlets, or through the second outlet only responsive to the temperature of fluid flowing through the device.

The outlet valve means may comprise a first closure portion operable to close the first outlet and a second closure portion operable to close the second outlet.

The outlet valve means may comprise a closure member, the closure member comprising the first and second closure portions, the device being operable to actuate the closure member between first and second positions, in the first position the closure member being arranged to allow fluid to flow out from the device through the first outlet and not through the second outlet, in the second position the closure member being arranged to allow fluid to flow out from the device through the second outlet and not the first outlet, wherein at a position intermediate the first and second positions the closure member is arranged to allow flow of fluid out from the device through both the first and second outlets.

Thus it is to be understood that in the first position of the closure member the first closure portion is arranged to allow flow of fluid out from the device and the second closure portion is arranged to prevent flow of fluid out from the device. In the second position of the closure member the first closure portion is arranged to prevent flow of fluid out from the device and the second closure portion is arranged to allow flow of fluid out from the device.

A transition from a flow of fluid entirely through the first outlet to flow of fluid entirely through the second outlet may be made relatively slowly, rather than substantially abruptly, allowing improved thermal control of an engine.

The device may comprise inlet valve means for selectively allowing fluid to flow into the device through the second inlet, the inlet valve means being operable between a closed condition in which fluid is prevented from flowing through the valve means and an open condition in which fluid is permitted to flow through the inlet valve means.

The device may be operable wherein when the temperature of fluid flowing through the device is below a first critical temperature the inlet valve means is in the closed condition and the outlet valve means is in the first condition, the device being operable to actuate the first inlet valve means to assume the open condition but to maintain the outlet valve means in the first condition when a temperature of fluid flowing through the first inlet exceeds the first critical temperature.

In some embodiments, the flow of coolant through an engine block via the second inlet may be initiated before coolant flow out from the device through the second outlet is initiated.

The device may be operable to control the first and second closure members wherein when the temperature of fluid flowing through the device is greater than the first critical temperature but less than a second critical temperature flow of fluid is permitted through the first and second outlets.

The device may be operable to actuate the closure member to assume an intermediate position when the temperature of fluid flowing through the device is greater than the first critical temperature but less than the second critical temperature thereby to allow flow of fluid through the first and second outlets.

The device may be operable to actuate the closure member to assume the second position when the temperature of fluid flowing through the device is greater than the second critical temperature.

The second closure portion may be operable to transition from a closed position in which fluid is prevented from flowing through the second outlet to an open position in which fluid is permitted to flow through the second outlet by translation of the second closure portion in a direction downstream of a flow of fluid through the second outlet.

An amount of force required to initiate opening of the second closure portion may be reduced relative to an arrangement in which the second closure portion opens in a direction upstream of a direction of fluid flow through the second outlet.

The device may comprise pressure release means, the pressure release means being operable to allow a flow of fluid through the second outlet when a pressure of fluid in the device exceeds a prescribed value.

Thus if the pressure of fluid in the device due to a pressure of fluid flowing into the device exceeds the prescribed value the pressure release means allows flow of fluid through the second outlet.

The pressure release means may be operable to control the second closure portion to assume the open condition when the pressure of fluid in the device exceeds the prescribed value.

Actuation of the inlet valve means and the outlet valve means may be coordinated by mechanical coupling.

The inlet valve means and outlet valve means of the device may be permanently coupled mechanically. Alternatively the device may be operable to be coupled when required.

The device may be operable to actuate the inlet valve means by thermal expansion of a first material of the device.

The first material may be a wax although any material with a suitable thermal expansion coefficient characteristic as a function of temperature may be employed.

The material in some embodiments has a relatively large thermal expansion coefficient over a relatively narrow temperature range at which actuation of the inlet valve means is required, the thermal expansion coefficient being relatively low at temperatures above and below this range that are experienced by fluid flowing through the device in normal use. Thus, a relatively large change in volume of the wax occurs over a relatively narrow temperature range.

The device may be further operable to actuate the outlet valve means by thermal expansion of the first material.

The device may be further operable to actuate the outlet valve means by thermal expansion of a second material of the device.

The first material has a melting point lower than that of the second material.

The device may be operable to heat the first material by means of electrical heating means.

The electrical heating means may comprise an electrical resistance heater. The heater may comprise a coil of wire or other resistive element through which electrical current may be passed to heat the heating means.

Opening of the inlet and/or outlet valve means may be performed under the control of control means regardless of the temperature of fluid flowing through the device.

The device may be operable to heat the second material by means of electrical heating means.

In one aspect of the invention there is provided a motor vehicle motor cooling system for controlling flow of coolant through a motor of a motor vehicle, the system comprising a fluid flow control device having a feature according to one or more preceding paragraphs.

The motor may be an internal combustion engine. Alternatively the motor may be an electric machine operable as a propulsion motor.

In a further aspect of the invention there is provided a motor in combination with a motor cooling system having a feature according to one or more preceding paragraphs.

The motor may be an internal combustion engine, wherein the first inlet of the fluid flow control device is connected to a cylinder head coolant outlet of the engine and the second inlet of the fluid flow control device is coupled to a cylinder block coolant outlet of the engine.

Optionally the first outlet of the fluid flow control device is coupled to a radiator bypass conduit and the second outlet is coupled to a radiator conduit, the radiator conduit being arranged to direct fluid to flow through a radiator of the vehicle for cooling the coolant.

In an aspect of the invention there is provided a motor vehicle comprising a motor having a feature according to one or more preceding paragraphs.

In one aspect of the invention there is provided a method of controlling flow of coolant through a motor vehicle motor cooling system by means of a fluid flow control device, the method comprising selectively directing coolant flowing into the device through one or both of first and second inlets to flow out from the device through one or both of first and second outlets responsive to a temperature of fluid flowing through the device, the method further comprising allowing or preventing flow of coolant into the device through the second inlet responsive to the temperature of fluid flowing through the device.

In one aspect of the invention there is provided a fluid flow control device for controlling flow of coolant in a motor vehicle coolant flow control apparatus, the flow control device having first and second coolant inlets and first and second coolant outlets, the flow control device being operable selectively to allow or to prevent flow of coolant into the device through the second inlet responsive to a temperature of fluid flowing through the device and to direct coolant flowing into the device to flow out from the flow device through the first or second outlets responsive to the temperature of the fluid.

In one aspect of the invention there is provided a method of controlling flow of coolant through a motor vehicle motor cooling system by means of a fluid flow control device, the method comprising selectively directing coolant flowing into the device through one or both of first and second inlets to flow out from the device through one or both of first and second outlets responsive to a temperature of fluid flowing through the device, the method further comprising allowing or preventing flow of coolant into the device through the second inlet responsive to the temperature of fluid flowing through the device.

Within this document it is expressly intended that the various aspects, embodiments, examples and alternatives, and in particular the individual features thereof, set out in the preceding paragraphs, in the claims and/or in the following description and drawings may be taken independently or in any combination. For example, features disclosed in connection with one embodiment are applicable to all embodiments, except where such features are incompatible.

BRIEF DESCRIPTION OF THE DRAWINGS

One or more embodiments of the invention will now be described, by way of example only, with reference to the accompanying figures in which.

DETAILED DESCRIPTION

Figure 1:
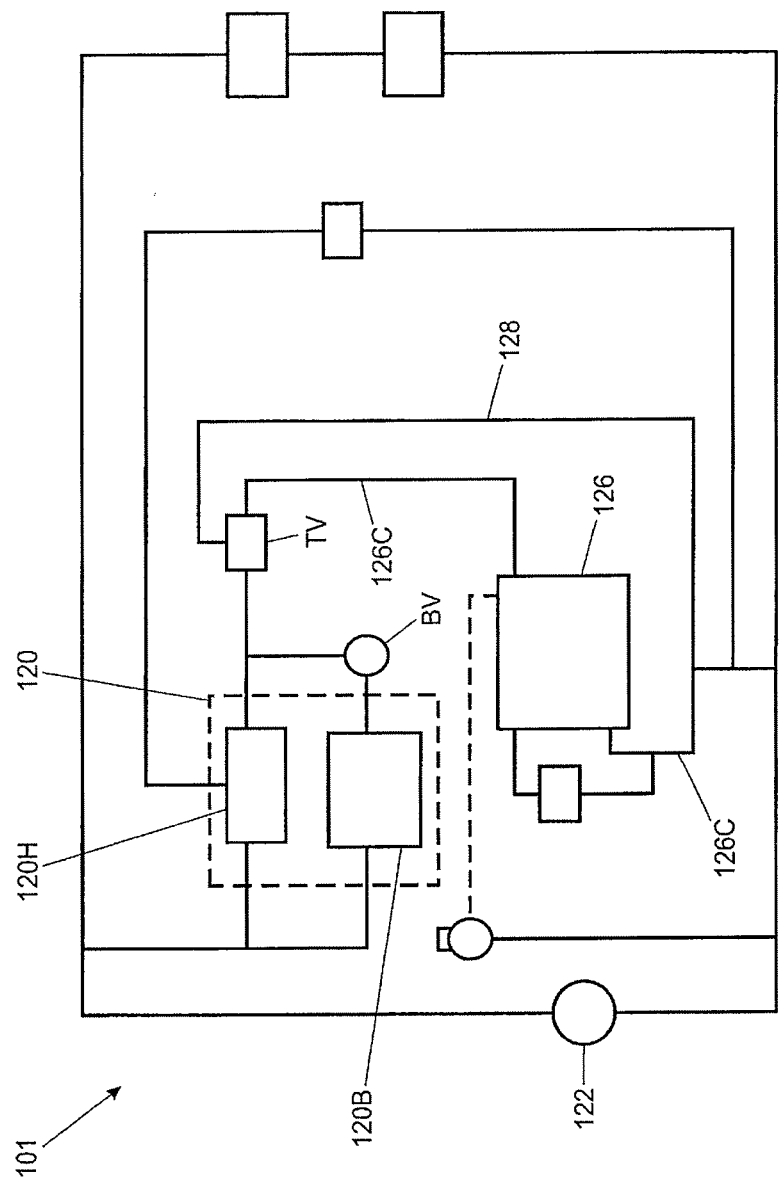
FIG. 1 is a schematic diagram of a known motor vehicle coolant flow control apparatus or cooling circuit.
Figure 2:
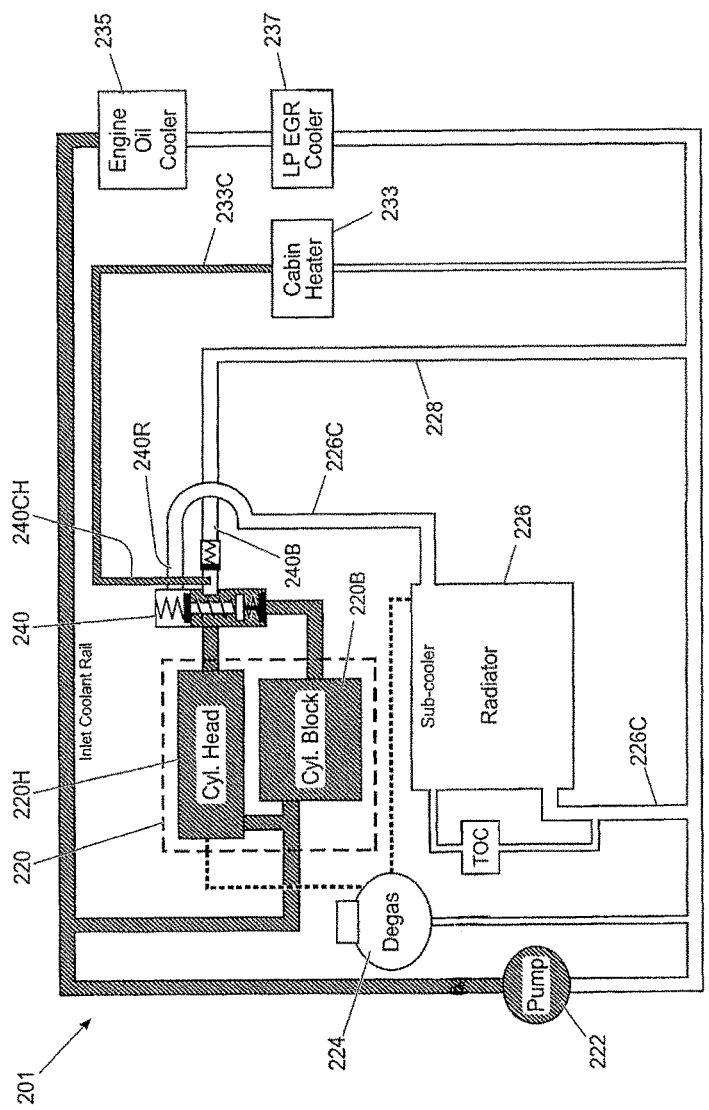
FIG. 2 is a schematic diagram of a motor vehicle coolant flow control apparatus according to an embodiment of the present invention.

FIG. 2 is a schematic illustration of a coolant circuit 201 according to an embodiment of the present invention. The circuit 201 is coupled to an engine 220 and is arranged to provide a flow of coolant through the engine 220.

The engine 220 has a cylinder head portion 220H and a cylinder block portion 220B. An engine-driven coolant pump 222 is arranged to pressurise coolant and deliver pressurised coolant to a coolant inlet of the cylinder head portion 220H and cylinder block portion 220B of the engine 220.

A coolant outlet of each of the cylinder head portion 220H and cylinder block portion 220B is coupled to a respective inlet of an integrated valve module (IVM) 240. The IVM 240 has three outlets: a radiator flow outlet 240R; a radiator bypass flow outlet 240B; and a cabin heater flow outlet 240CH. In some embodiments the cabin heater flow outlet 240CH is not provided.

The radiator flow outlet 240R is coupled to a radiator conduit 226C arranged to direct coolant to flow through a radiator 226. The radiator bypass flow outlet 240B is coupled to a radiator bypass conduit 228 which directs coolant to bypass the radiator 226. The bypass conduit 228 is coupled to a portion of the radiator conduit 226C downstream of the radiator 226. The cabin heater flow outlet 240CH is coupled to a cabin heater conduit 233C that directs coolant through a cabin heater matrix or cabin heater heat exchanger 233. A downstream end of the cabin heater conduit 233C is coupled to the portion of the radiator conduit 226C downstream of the radiator 226. In the present embodiment, coolant flowing through the radiator conduit 226C, radiator bypass conduit 228 or cabin heater heat exchanger 233 converges at a common node from which the coolant is drawn through the engine-driven coolant pump 222. Other arrangements are also useful.

In some embodiments where the IVM 240 does not have a cabin heater flow outlet 240CH, the cabin heater heat exchanger 233 may be provided with a flow of coolant from a different source. In some embodiments, the flow of coolant may be provided directly from the engine 220, for example directly from the cylinder head 220H. Other sources of coolant are also useful.

In some embodiments in which the cabin heater heat exchanger 233 is not provided with a flow of coolant from the IVM 240, the IVM 240 may have a coolant outlet similar to the cabin heater flow outlet 240CH that is arranged to provide a flow of coolant to a different component. In some embodiments the IVM 240 may provide a flow of coolant to a throttle body instead of the cabin heater heat exchanger 233. This feature may assist in preventing formation of ice on the throttle body. Other arrangements are also useful.

In the embodiment of FIG. 2 the coolant pump 222 also delivers pressurised fluid to a coolant inlet of an engine oil cooler 235 which is connected in series with a low pressure exhaust gas recirculation (LP EGR) cooler 237. A coolant outlet of the LP EGR cooler 237 is coupled to an inlet of the coolant pump 222.

A degassification (degas) tank 224 is provided in fluid communication with the inlet of the coolant pump 222, a coolant volume within the cylinder head 220H and the radiator 226. The degas tank 224 allows air bubbles within the coolant circuit 201 to be vented to atmosphere.

Figure 3:
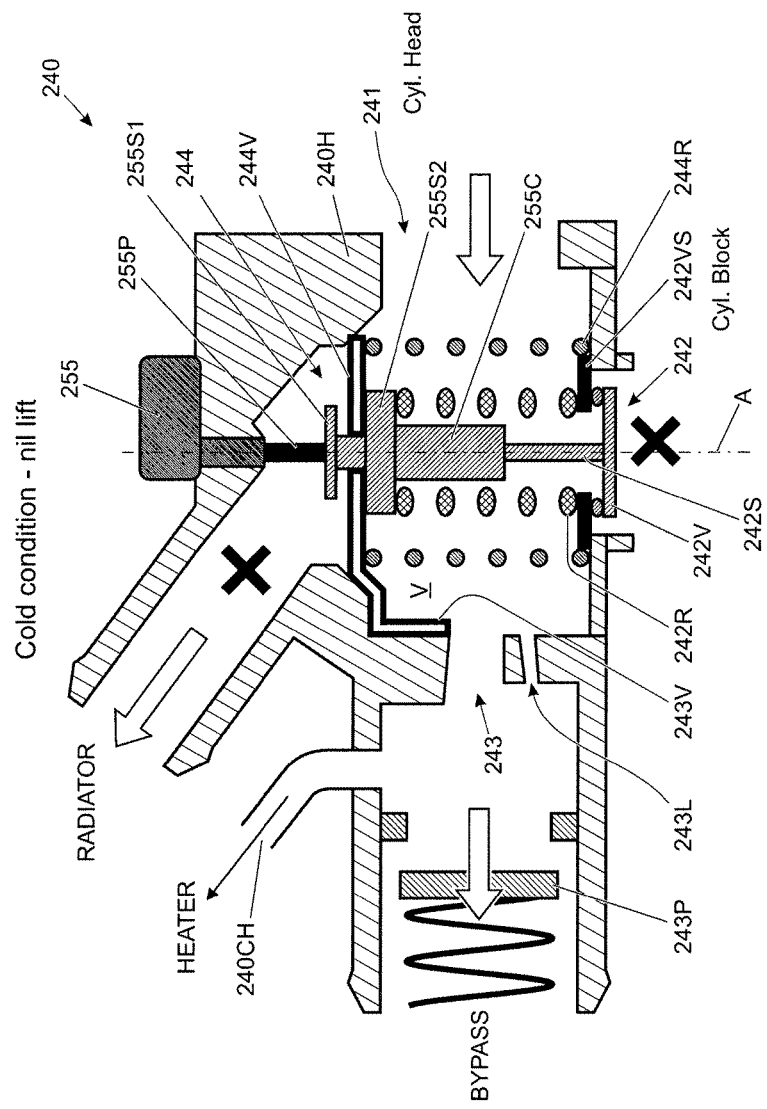
FIG. 3 is a schematic illustration of a configuration of an integrated valve module according to an embodiment of the invention when a coolant temperature is below a first temperature T1.

The structure of the IVM 240 is shown in further detail in FIG. 3. FIG. 3 shows the IVM 240 in a first configuration being a configuration assumed by the IVM 240 when the temperature of coolant flowing through the IVM 240 is below a first temperature T1. The first temperature T1 corresponds to a temperature below which circulation of coolant is required through the cylinder head portion 220H of the engine 220 but not through the cylinder block portion 220B. This is so as to allow coolant in the cylinder block portion 220B to warm more quickly. Furthermore, the coolant temperature is sufficiently low that cooling of the coolant by means of the radiator 226 is not required. It is to be understood that in some embodiments it may be undesirable for cooling of the coolant to take place when the coolant temperature is below T1 since an efficiency or performance of the engine 220 may be sub-optimum in this temperature range.

The IVM 240 has a body portion providing a housing 240H defining a cylinder head fluid inlet (CHI) aperture 241, a cylinder block fluid inlet (CBI) aperture 242, a radiator bypass outlet (RBO) aperture 243 and a radiator outlet (RO) aperture 244.

In the embodiment of FIG. 3 the CHI aperture 241 is arranged to be permanently open. The CBI aperture 242 may be opened or closed by means of a CBI valve member 242V as it moves between open and closed positions. In some alternative embodiments, the CBI aperture 242 may also be permanently open, as in the case of the CHI aperture 241.

The RO aperture 244 may be opened or closed by means of a RO valve member 244V as it moves between open and closed positions whilst the RBO aperture 243 may be opened or closed by means of a RBO valve member 243V as it moves between open and closed positions. The RBO valve member 243V is in the form of a gate valve or 'sluice' valve member 243V, being a valve member 243V that is arranged to move in a lateral manner with respect to a longitudinal axis of the aperture 243 to be closed, varying an amount by which the aperture 243 is blocked. This is in contrast to other valve members such as the CBI valve member 242V, which moves in a longitudinal manner towards or away from the CBI aperture 242, varying a gap between a face of the valve member 242V and the portion of the housing 240H defining the aperture 242.

In the embodiment shown in FIG. 3 the RBO valve member 243V is integrally formed with and arranged to move with the RO valve member 244V.

The IVM 240 has an actuation assembly 255 operable to move the valve members 242V, 243V, 244V between open and closed positions responsive to a temperature of coolant flowing through the IVM 240. The actuation assembly 255 has a piston 255P operable to slide within a cylinder or barrel 255C of the assembly 255. The piston 255P is provided in a substantially fixed position with respect to the housing 240H and protrudes through the RO valve member 244V and into a volume of the cylinder 255C within the inner coolant volume V of the IVM 240. The cylinder 255C is exposed to a flowstream of coolant into the IVM 240 through the CHI aperture 241 or the CBI aperture 242.

A layer of a wax material is provided within the cylinder 255C, packed between an inner wall of the cylinder 255C and the piston 255P. The wax material has a melting point corresponding to a temperature T1 of coolant flowing through the CHI aperture 241 at which it is required to open the CBI aperture 242 by movement of the CBI valve member 242V. In the embodiment shown T1 is around 75° C. T1 may also be referred to as a CBI valve opening temperature.

When the wax material melts, the material expands, urging the cylinder 255C to move in an axial direction towards the CBI aperture 242. The cylinder 255C has a valve stem 242S coupled thereto at one end thereof, the stem 242S being oriented substantially coaxial with the piston 255P. The CBI valve member 242V is coupled to the stem 242S at an opposite end of the stem 242S to the cylinder 255C. Thus, when the cylinder 255C moves axially as the wax expands, the CBI valve member 242V moves in an axial direction to the CBI valve open position. The CBI aperture 242 is thereby opened when the wax melts.

The cylinder 255C has a pair of annular stops 255S1, 255S2 provided therearound at axially spaced locations of the cylinder 255C. The RO valve member 244V is provided coaxial with the cylinder 255C and is slidable along a portion of the cylinder 255C between the stops 255S1, 255S2. An RO valve member spring element 244R is provided around the cylinder 255C and is arranged to bias the RO valve member 244V towards the closed position, being the position assumed by the RO valve member 244V in the first configuration of FIG. 3. One end of spring element 244R contacts the RO valve member 244V, an opposite end of the spring element 244R being arranged to contact an inner wall of the housing 240H surrounding the CBI aperture 242.

A CBI valve member spring element 242R is also provided around the cylinder 255C and stem 242S, the spring element 242R being arranged to bias the CBI valve member 242V towards the closed position, being the position assumed by the CBI valve member 242V in the first configuration of FIG. 3.

A first end of the spring element 242R contacts an annular CBI valve seat 242VS which surrounds the CBI aperture 242 on an inside of the housing 240H. In the embodiment of FIG. 3 the CBI valve seat 242VS is fixedly coupled to the housing 240H and defines the CBI inlet aperture 242. A second end of the spring element 242R contacts stop member 255S2 of the cylinder 255C. The spring element 242R therefore biases cylinder 255C in a direction with respect to the piston 255P that is opposite that in which melting of wax moves the cylinder 255C. This assists return of the cylinder 255C to the position shown in FIG. 3 (in which the CBI valve member 242V is in the closed position) on cooling of the wax material.

As noted above, the first configuration of the IVM 240 shown in FIG. 3 is that typically assumed when the engine 220 is started from cold and the coolant temperature is below T1. The CBI inlet aperture 242 and RO aperture 244 are both closed, forcing coolant that flows into the IVM 240 through CHI aperture 241 to flow out from the IVM 240 via RBO aperture 243. On an outlet side of the RBO aperture 243 coolant may flow to the radiator bypass conduit 288 via an RBO pressure relief valve (RBO PRV) 243P or directly to the cabin heater heat exchanger conduit 240CH.

It is to be understood that RBO PRV 243P is arranged to open when a coolant pressure difference across the valve 243P is sufficiently high, This is so as to ensure that an adequate flow of coolant is maintained through the cabin heater heat exchanger conduit 233C when the PRV 243P is open.

A leak conduit 243L is provided through a portion of the housing 240H in parallel with the RBO aperture 243, allowing coolant to flow to the outlet side of the RBO aperture 243 without having to pass through the RBO aperture 243. As discussed below, this feature allows a flow of coolant through the cabin heater heat exchanger conduit 233C to be maintained even when the RBO aperture 243 is closed.

Figure 4:
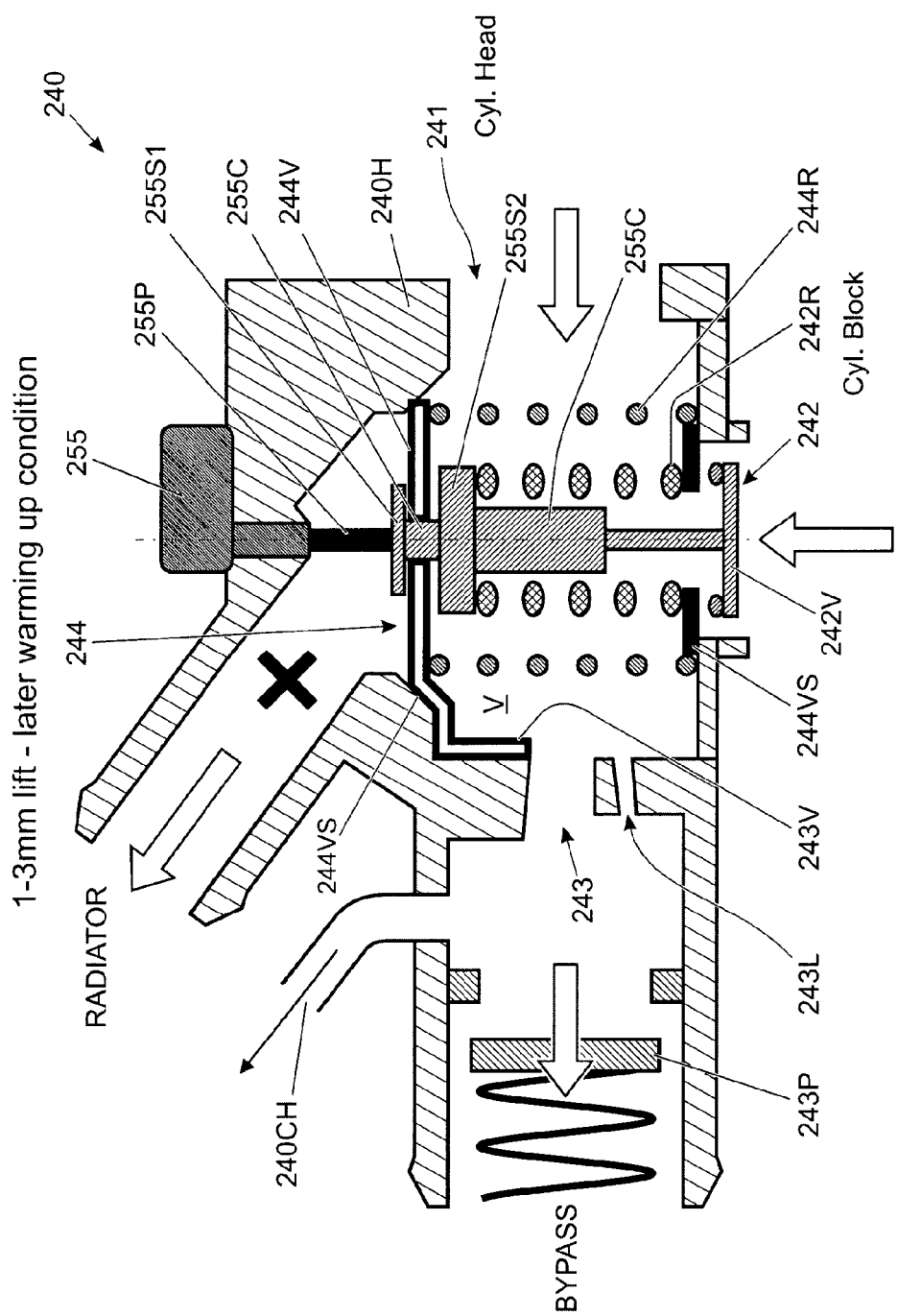
FIG. 4 is a schematic illustration of the configuration of the integrated valve module of FIG. 3 when the coolant temperature is between T1 and a second temperature T2 being a radiator outlet (RO) valve opening temperature T2.

As discussed above, as the engine 220 warms and the coolant temperature rises above T1, the wax material contained within the cylinder 255C melts and the cylinder 255C moves in a direction towards the CBI aperture 242. The IVM 240 therefore assumes a second configuration which is illustrated in FIG. 4.

It is to be understood that movement of the CBI valve member 242V takes place against the bias of CBI valve member spring element 242R which becomes increasingly compressed as the cylinder 255C moves towards the CBI aperture 242. As the cylinder 255C so moves, the CBI valve member 242V is moved from the closed position of the first configuration of FIG. 3 to an open position.

As described above, in the second configuration of FIG. 4 the temperature of coolant now exceeds the CBI valve opening temperature T1 but is less than a second (RO valve opening) temperature T2 where T2 >T1.

In the second configuration the RO valve member 244V is maintained in the closed position by spring element 244R. As the cylinder 255C moves towards the CBI aperture 242, a portion of the cylinder 255C between stops 255S1, 255S2 slides through the aperture in RO valve member 244V. With further movement of the cylinder 255C in the same direction, the first stop 255S1 of the cylinder 255C will contact the RO valve member 244V and the RO valve member will be displaced away from abutment with a valve seat portion 244VS of the housing 240H against which the RO valve member 244V rests when in the closed position. The RO aperture 244 is therefore opened (see below).

It is to be understood that in the second configuration of the IVM 240 illustrated in FIG. 4 coolant is able to flow through both the CHI aperture 241 and the CBI aperture 242 from the engine 220. Coolant flowing through the CHI aperture 241 and the CBI aperture 242 flows out from the IVM 240 through RBO aperture 243 only.

Figure 5:
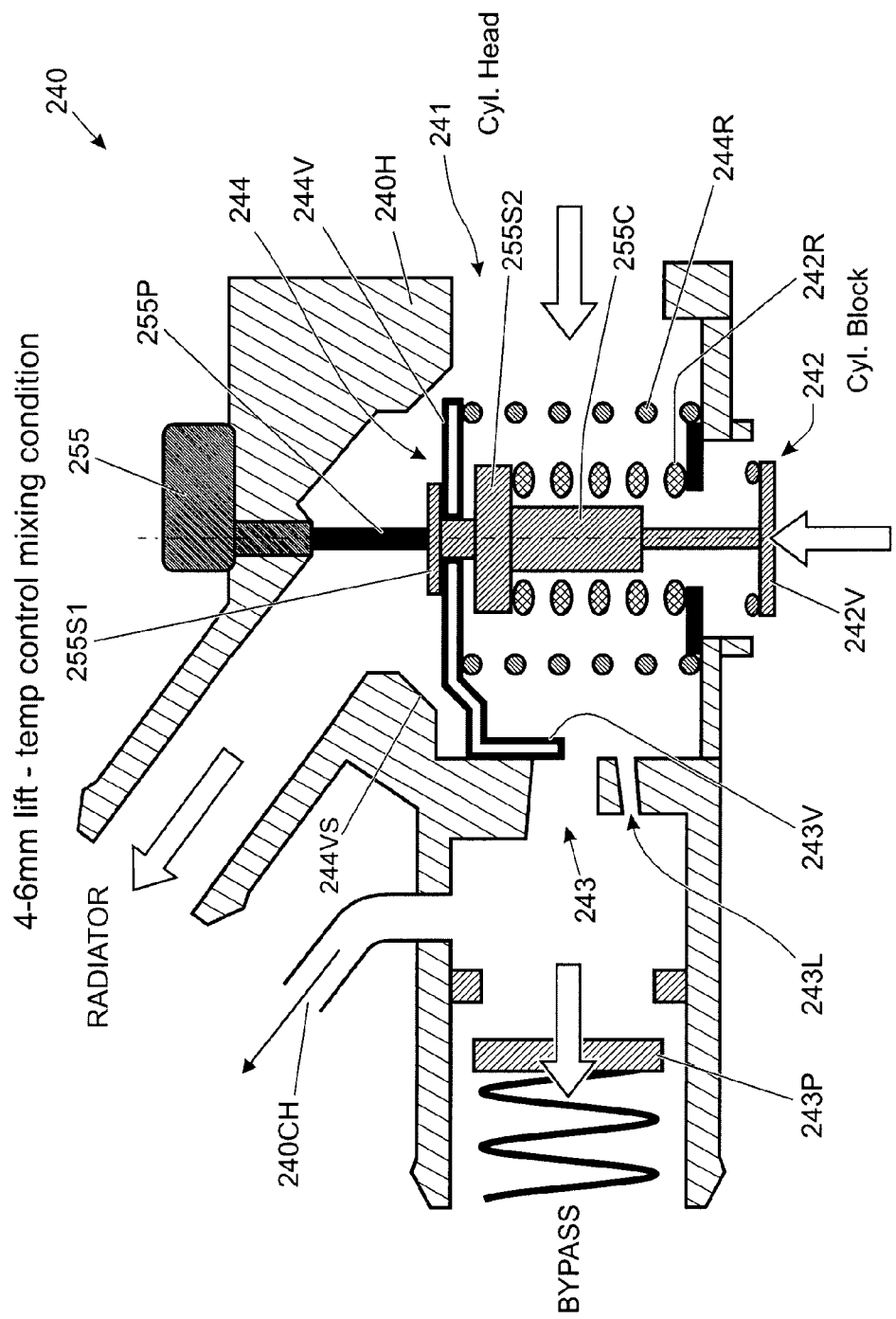
FIG. 5 is a schematic illustration of the configuration of the integrated valve module of FIG. 3 when the coolant temperature T3 exceeds the RO valve opening temperature T2 but is less than a radiator bypass outlet (RBO) valve closure temperature T4.

FIG. 5 shows the IVM 240 of FIG. 3 in a third configuration in which the temperature of coolant T3 now exceeds the second RO valve opening temperature T2 where T3>T2. Wax material in the cylinder 255C has further expanded causing the cylinder 255C to be displaced axially further with respect to piston 255P. The CBI valve member 242 has therefore opened further. In addition, the first stop member 255S1 has moved into abutment with RO valve member 244V and displaced RO valve member 244V away from the RO aperture seat member 244VS to an open position. Coolant flowing into the IVM 240 may therefore flow out from the IVM 240 through the RO aperture 244 or the RBO aperture 243.

Because the RBO valve member 243V is arranged to move with the RO valve member 244V, movement of the RO valve member 244V to the open condition has resulted in movement of the RBO valve member 243 towards a position in which the valve member 243 closes the RBO aperture 243. The amount of coolant that is permitted to flow through the RBO aperture 243 relative to that flowing through the RO aperture 244 is therefore reduced. Consequently a pressure of coolant forcing RBO PRV 243P to an open condition (as shown in FIG. 5) is reduced, and the RBO PRV 243P begins to close.

Figure 6:
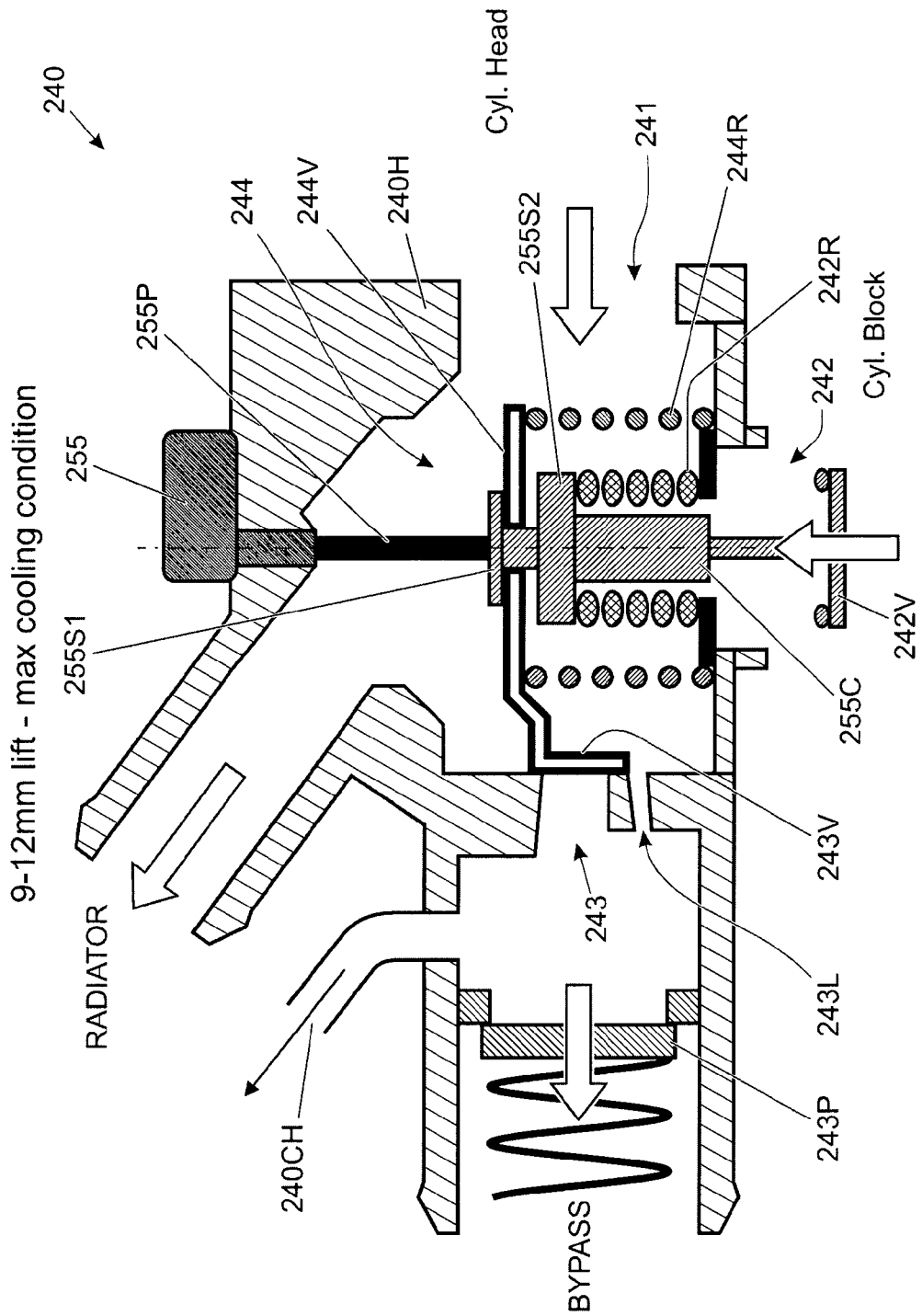
FIG. 6 is a schematic illustration of the configuration of the integrated valve module of FIG. 3 when the coolant temperature exceeds the RBO valve closure temperature T4.

FIG. 6 shows the IVM 240 of FIG. 3 in a fourth configuration in which the temperature of coolant now exceeds a RBO valve closure temperature T4 where T4>T3. Wax in the cylinder 255C has expanded sufficiently to cause the cylinder 255C to move the first stop member 255S1 (and therefore the RB valve member 244V and RBO valve member 243V) a sufficient distance towards the CBI aperture 242 that the RBO valve member 243V assumes a closed position. In the closed position coolant is unable to flow through the RBO aperture 243. However as noted above, coolant is still able to flow through the RBO leak conduit 243L. The leak conduit 243L is arranged to allow sufficient coolant to flow therethrough to service cabin heater heat exchanger 233 even when the RBO aperture 243 is closed. Consequently substantially all coolant flowing into the IVM 240 flows out from the IVM 240 through RO aperture 244.

It can be understood from FIG. 6 that in the fourth configuration the first stop 255S1 of the cylinder 255C maintains the RO valve member 244V in the open condition against a bias force imposed by the RO valve member spring element 244R. In addition, CBI valve member spring element 242R acts against the second stop 255S2 and the pressure imposed by melted wax urging the cylinder 255C in an axial direction away from the piston 255.

It is to be understood that when the cylinder 255C subsequently cools below T4 both spring elements 242R, 244R urge the cylinder 255C axially towards the piston 255P, away from CBI aperture 242. Movement of the cylinder 255C as the cylinder 255C cools follows substantially the reverse process to that described above in respect of movement as the cylinder 255C is warmed.

It is to be understood that in some embodiments heating of wax material in the cylinder 255C occurs exclusively by transfer of thermal energy from coolant flowing through the IVM 240. In some embodiments electrical heating means such as a heating coil may be provided for heating the wax material under the control of an electrical controller when it is required to move (or 'actuate') the cylinder 255C towards the CBI aperture 242. Electrical heating means may be employed to supplement heating of the wax material. In some embodiments electrical heating means may be employed to heat the wax material when the coolant temperature reaches one or more of temperatures T1, T2, T3 and T4.

In some embodiments a 'twin wax' arrangement is provided in which the wax material comprises two different types of wax medium, each having a different respective melting point. In some such embodiments, the cylinder 255C may be packed with 'twin wax' media having a wax medium of lower melting point that melts around temperature T1 and a wax medium of higher melting point that melts around temperature T2. As the temperature of coolant flowing through the IVM 240 rises through T1 the lower melting point wax melts and expands to cause the IVM 240 to assume the configuration of FIG. 4. Wax medium of higher melting point melts around temperature T2, causing the cylinder to move further axially and the IVM 240 assumes the configuration of FIG. 5. With further heating of the cylinder 255C the cylinder moves to assume the configuration of FIG. 6.

It is to be understood that in some embodiments three or more different wax media may be employed, each having a different respective melting point.

In some embodiments of the invention such as that described below with respect to FIG. 8, the CBI valve member 242V may be arranged to open in an opposite direction to that of the embodiment of FIG. 3, i.e. inwardly with respect to the housing 240H rather than outwardly, against the bias of a spring element.

In some embodiments, when the CBI valve member 242V is in the closed position, the IVM 240 is operable to open the CBI valve member 242V if a pressure of coolant in a portion of the engine such as the cylinder block portion 220B exceeds a prescribed value. This feature may be referred to as a 'blow open' feature and may be arranged such that above a prescribed engine speed (such as around 1500 rpm) the CBI valve member 242V assumes the open position.

In some embodiments a blow open feature may also be associated with one or more other valve members in addition or instead, such as RO valve member 244V and/or RBO valve member 243V. Thus if a pressure of coolant within the IVM 240 exceeds a prescribed value one or both of the RO valve member 244V and RBO valve member 243V may be arranged to open or fully open if they are not already open or fully open.

Figure 7:
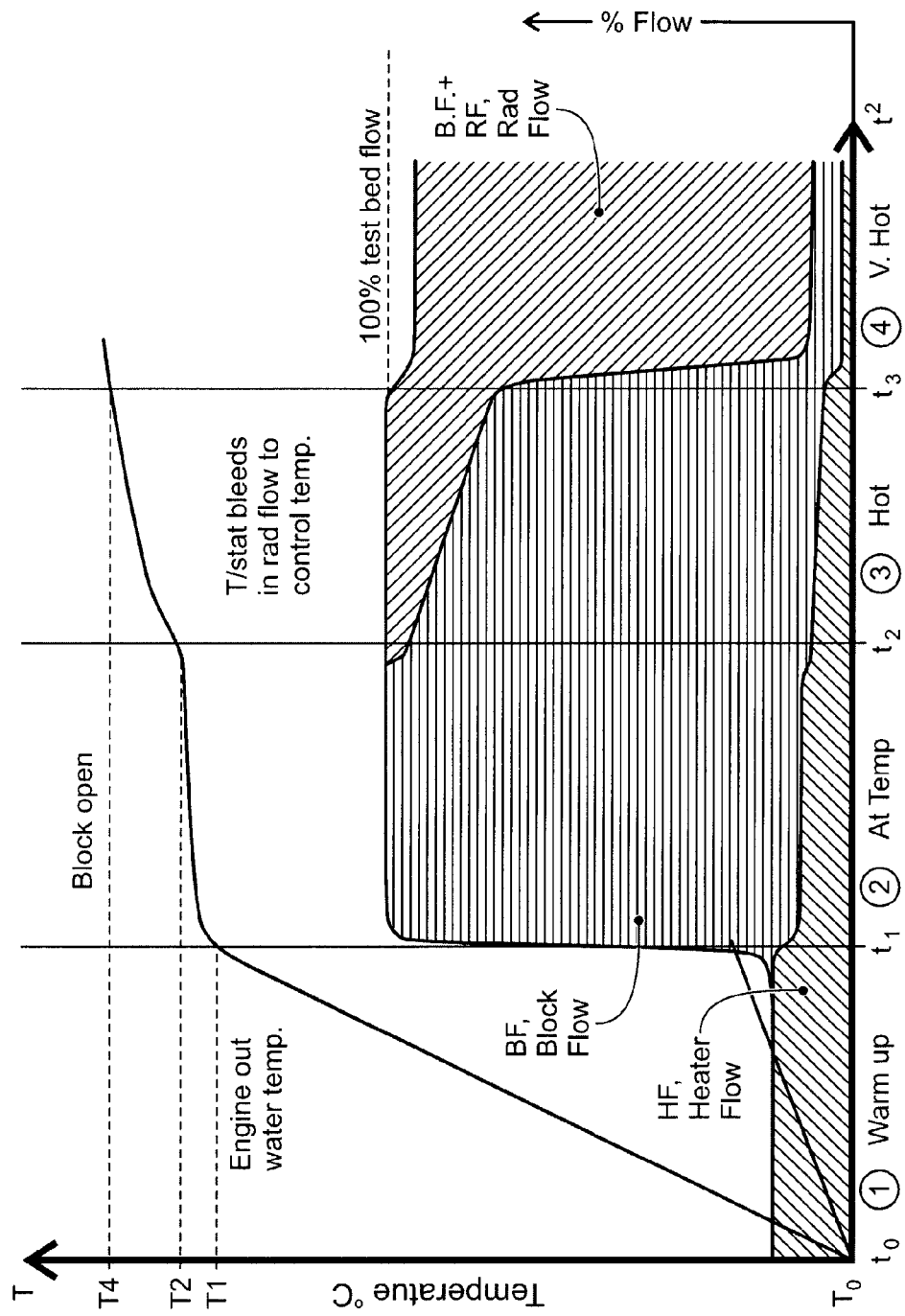
FIG. 7 is a plot of coolant temperature as a function of time during an initial stage of a drivecycle showing relative amounts of coolant flow through a cabin heater heat exchanger, cylinder block portion of an engine and radiator of the coolant circuit.

FIG. 7 shows a plot of temperature of coolant flowing through the IVM 240 as a function of time over an initial portion of a particular drivecycle for a coolant circuit according to an embodiment of the invention. The coolant circuit is substantially the same as the embodiment of FIG. 2.

In the drivecycle shown the vehicle is started from cold at time t0, where the temperature of coolant is T0<T1. It can be seen that coolant flows through the cabin heater heat exchanger 233 when coolant temperature is less than T1. The proportion of coolant flowing through the engine 220 that flows through the cabin heater heat exchanger 233 is indicated by shaded 'heater flow' region HF of FIG. 7.

At time t1 the coolant temperature has risen to T1 and the CBI aperture 242 is opened, allowing coolant flow through the cylinder block portion 220B of the engine to take place. The relative proportion of the total flow of coolant through the engine 220 that flows through the cylinder block portion 220B compared with that through the cabin heater heat exchanger 233 is indicated by shaded 'block flow' region BF of FIG. 7.

At time t2 the coolant temperature exceeds T2. The RO aperture 244 is opened and coolant begins to flow through the radiator 226. It can be seen from FIG. 7 that the proportion of total coolant flowing in the system that flows through the radiator 22, shaded RF, compared with that flowing through the cylinder block portion 220B increases gradually until above temperature T4 the proportion increases abruptly as the RBO aperture 243 is closed by valve member 243V.

Because the flow of coolant through the bypass conduit 228 is substantially terminated, only a relatively small amount of coolant flows through the cabin heater heat exchanger 233. In some embodiments substantially no coolant flows through heat exchanger 233 above temperature T4.

It is to be understood that in the IVM 240 of FIGS. 2 to 6 the RO valve member 244V is arranged to be displaced in a direction against that of flow of fluid through the RO aperture 244 when the valve member 244V moves to the open condition. In some embodiments such as that of FIG. 8 and FIG. 9 the RO valve member 244V is arranged to be displaced in the opposite direction, i.e. not against the flow of fluid through the RO aperture when the RO aperture is opened. This has the advantage that an amount of force required to open the RO aperture is reduced. This reduces a risk that when the RO valve member 244V moves to an open position it moves in a relatively abrupt manner, causing a surge of coolant through the RO aperture. This surge can cause coolant in the radiator that is at a relatively low temperature to be introduced suddenly into the engine 220. A corresponding drop in temperature of coolant flowing out from the engine 220 through the IVM 240 can then occur, resulting in the establishment of oscillations in coolant flow rate through the radiator 226 as the IVM 240 responds to the change in coolant temperature.

Figure 8:
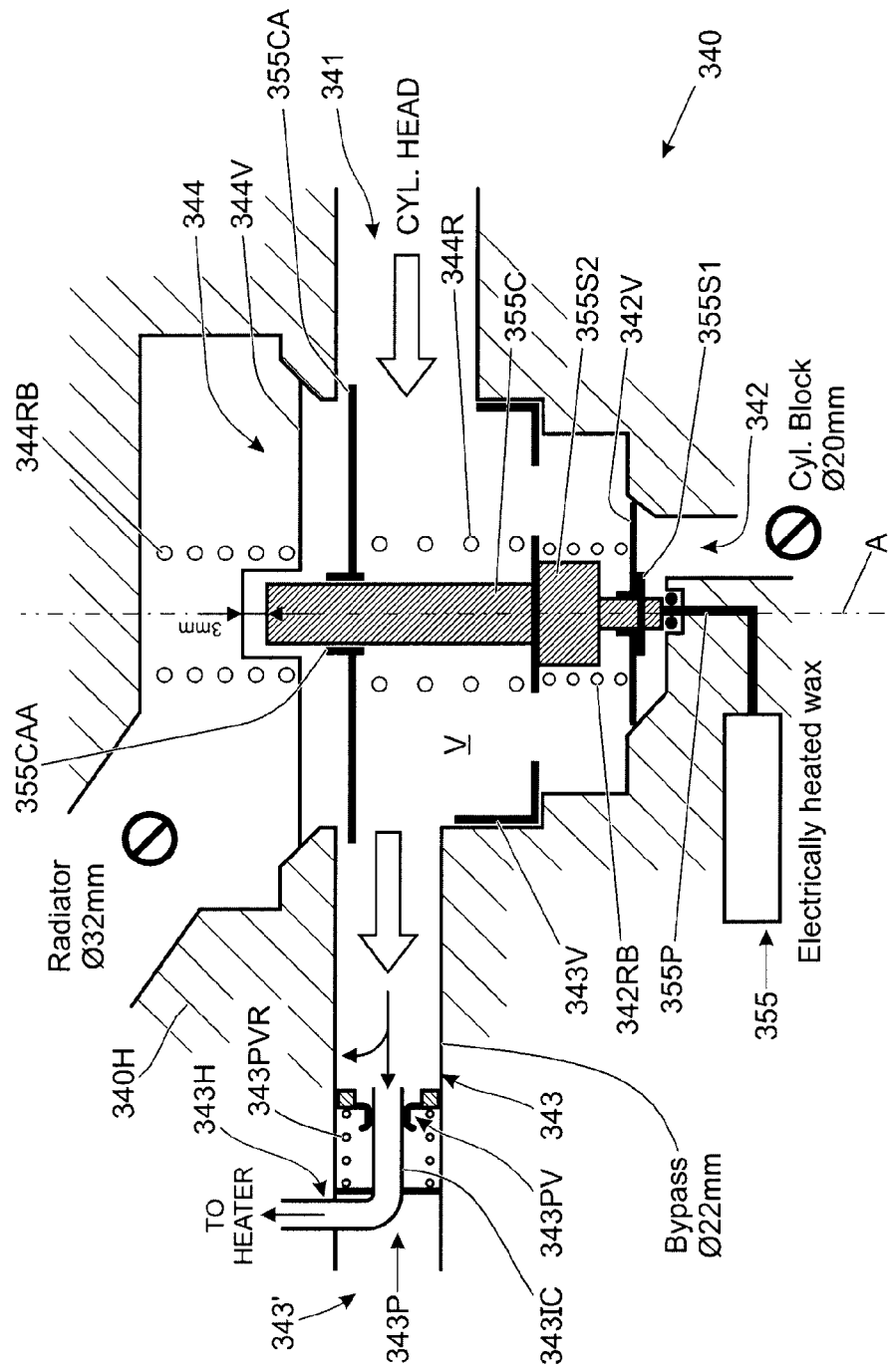
FIG. 8 is a cross-section view of an integrated valve module according to a further embodiment of the invention.

FIG. 8 shows an IVM 340 according to a further embodiment of the invention. Like features of the embodiment of FIG. 8 to those of the embodiment of FIG. 3 are shown with like reference signs prefixed numeral 3 instead of numeral 2. The IVM 340 is configured to operate in a similar manner to that of the embodiment of FIG. 3 except that a cylinder 355C of the embodiment of FIG. 8 moves in an opposite direction to that of the embodiment of FIG. 3 in order to move valve members, as described below.

A body portion of the IVM 340 providing a housing 340H defines a cylinder head fluid inlet (CHI) aperture 341, a cylinder block fluid inlet (CBI) aperture 342, a radiator bypass outlet (RBO) aperture 343 and a radiator outlet (RO) aperture 344 in a similar manner to the embodiment of FIG. 3. Valve members 342V, 343V, 344V are provided, the valve members being operable to seal against portions of the housing defining the CBI aperture 342, RBO aperture 343 and RO aperture 344 respectively in order to close the apertures when required. In some alternative embodiments, the CBI aperture 342 may be permanently open, as in the case of the CHI aperture 341.

An actuation assembly 355 is provided, the assembly being operable to move the valve members 342V, 343V, 344V from open to closed positions in a reversible manner responsive to a temperature of coolant flowing through the IVM 340. The actuation assembly 355 has a piston 355P operable to slide within the cylinder 355C of the assembly 355. The piston 355P is provided in a fixed position with respect to the housing 340H. The cylinder 355C protrudes through the CBI inlet valve member 342V and into an inner coolant volume V of the IVM 340. The cylinder 355C is exposed to a flowstream of coolant flowing into the IVM 340 through the CHI aperture 341, and to coolant flowing through the CBI aperture 342 when the CBI aperture 342 is open.

It is to be understood that the cylinder 355C is operable to move with respect to the piston 355P due to thermal expansion or contraction of a wax material in a similar manner to the embodiment of FIG. 3. However as noted above, in the embodiment of FIG. 8 the cylinder 355C is arranged to move in substantially the opposite direction to that in which it moves in the embodiment of FIG. 3 as the temperature of coolant increases.

A cylinder support member in the form of a support arm 355CA is provided within the inner coolant volume V. The arm 355CA is fixedly coupled to the housing 340H and provided with an aperture 355CAA through which the cylinder 355C passes with a relatively small gap between the cylinder arm aperture 355CAA and cylinder 355C. The arm 355CA is thereby able to constrain lateral movement of the cylinder 355C (normal to longitudinal axis A thereof).

A resilient spring member 344R is arranged to bias the cylinder 355C in a direction towards piston 355P by pushing against the support arm 355CA at one end and a portion of the RBO valve member 343V at the other.

The RBO valve member 343V is fixedly coupled to the cylinder 355C and arranged to move therewith as the cylinder 355C slides away from and toward the piston 355P. Unlike the embodiment of FIG. 3, the RBO valve member 343V and RO valve member 344V are not coupled together, but rather are movable independently of one another.

As described above, one end of the cylinder 355C passes through the CBI inlet valve member 342V. The cylinder 355C has respective first and second stop members 355S1, 355S2 provided therearound at spaced apart locations along a longitudinal axis A thereof. The stop members 355S1, 355S2 are provided on opposite sides of the CBI inlet valve member 342V. The CBI inlet valve member 342V is slidable parallel to the longitudinal axis A of the cylinder 355C between the stop members 355S1, 355S2, but is prevented from sliding past the stop members 355S1, 355S2.

A CBI inlet valve member blowpast spring member 342RB is arranged to bias the valve member 342V towards the first stop member 355S1. One end of the blowpast spring member 342RB acts against the CBI inlet valve member 342V whilst the other end acts against a portion of the RBO valve member 343V. As noted above, the RBO valve member 343V is fixedly coupled to the cylinder 355C and is substantially immovable with respect thereto.

In the particular configuration illustrated in FIG. 8 the wax material within cylinder 355C is below its melting temperature T1, and the cylinder member 355C is positioned substantially at one extreme of its range of movement. The CBI inlet valve member 342V is in a substantially closed position and flow of coolant through the CBI inlet aperture 342 is therefore prevented.

However if a pressure of coolant in the CB portion 220B of the engine 220 is sufficiently high, the CBI inlet valve member 342V may be displaced against the bias of blowpast spring member 342RB, allowing coolant to flow through the CBI aperture 342. In some embodiments the CBI valve member 342V may be so displaced when the valve member 342V is closed at an engine speed of 1500 rpm or greater. In some embodiments the valve member 342V may be arranged to move to an open position at a different engine speed. This feature of the CBI inlet valve member 342V may be referred to as blowpast or blow-open functionality.

The RO valve member 344V is provided at an opposite end of the cylinder 355C to the CBI valve member 342V. In the embodiment of FIG. 8 a gap is provided between the RO valve member 344V and a free end of the cylinder 355C when the coolant temperature is below T1. The gap is provided by a well region formed in the RO valve member 344V. The free end of the cylinder 355C moves into this well region as the cylinder 355C is initially displaced as the coolant temperature rises through T1. The shape of the RO valve member 344V may be described as a substantially 'top-hat' shape in the embodiment shown although other arrangements are also useful. Importantly, in some embodiments the actuation assembly is permitted to cause the cylinder 355C or like member to move a certain distance when the coolant temperature initially rises above T1, opening CBI aperture 342, before RO aperture 344 is opened.

The RO valve member 344V is biased in a direction towards the cylinder 355C and into abutment with a portion of the housing 340H defining the RO aperture 344 by means of a resilient blowpast spring member 344RB. When the coolant temperature is below T1 the RO valve member 344V is able to close the RO aperture 344 as noted above. However, if a pressure of coolant in the inner coolant volume V exceeds a prescribed value, the valve member 344V may be displaced to open the RO aperture 344 against the bias of blowpast spring member 342RB, allowing flow of coolant through the RO aperture 344. Advantageously this allows relief of coolant pressure within the IVM 340 (and therefore within engine 220) at higher engine speeds. Since an amount of thermal energy required to be dissipated increases at higher engine speeds, opening of the RO aperture 344 allows increased cooling of coolant.

As the temperature of coolant flowing through the IVM 340 increases through T1, wax material between the piston 355P and cylinder 355C melts. The resulting expansion of the wax causes displacement of the cylinder 355C in an axial direction away from the piston 355P. As the cylinder 355C is so displaced, CBI valve member 342V moves to an open position and RBO valve member 343V moves toward a closed position. However the RBO valve member 343V is arranged such that it does not begin to block the RBO aperture 343 until the RO aperture 344 has begun to open as described below.

The RO valve member 344V remains in the closed position as the coolant temperature rises through T1 but a gap between the free end of the cylinder 355C and RO valve member 344V decreases. Coolant is able to flow into the IVM 340 through both the CHI aperture 341 and CBI aperture 342. Coolant is able to flow out from the IVM 340 through the RBO aperture 343 only.

When the temperature of coolant exceeds a radiator outlet (RO) valve opening temperature T2, the cylinder 355C moves a sufficient distance to contact the RO valve member 344V and cause the valve member 344V to be displaced to an open position against the bias of spring member 344RB. As the cylinder 355C displaces the RO valve member 344V, the RBO valve member 343V begins to close RBO aperture 343.

As the coolant temperature rises to a radiator bypass outlet (RBO) valve closure temperature T4 the cylinder 355C displaces to a position where the RBO valve 343V is closed at or immediately above T4. At this temperature both the CBI inlet aperture 342 and RO aperture 344 are fully open.

It is to be understood that, upon cooling, movement of the cylinder 355C and valve members 342V, 343V and 344V is the reverse of that described above.

It is to be understood that the actuation assembly may comprise electrical heating means in the form of a heater such as a an electrical resistance heater operable to heat wax material in the cylinder 355C when it is required to open one or more of the CBI aperture 342, RBO aperture 343 and RO aperture 344. As described with respect to the embodiment of FIG. 3 the cylinder 355C, 255C may contain a wax material having two or more different wax media of different respective melting points. For example in a so-called twin-wax medium one wax medium may melt at or around temperature T1 whilst another wax medium may melt at or around temperature T2. A third wax medium may be provided in some embodiments having a different melting temperature to the other two media. The medium may be or comprise a wax or any other suitable medium.

Figure 9:
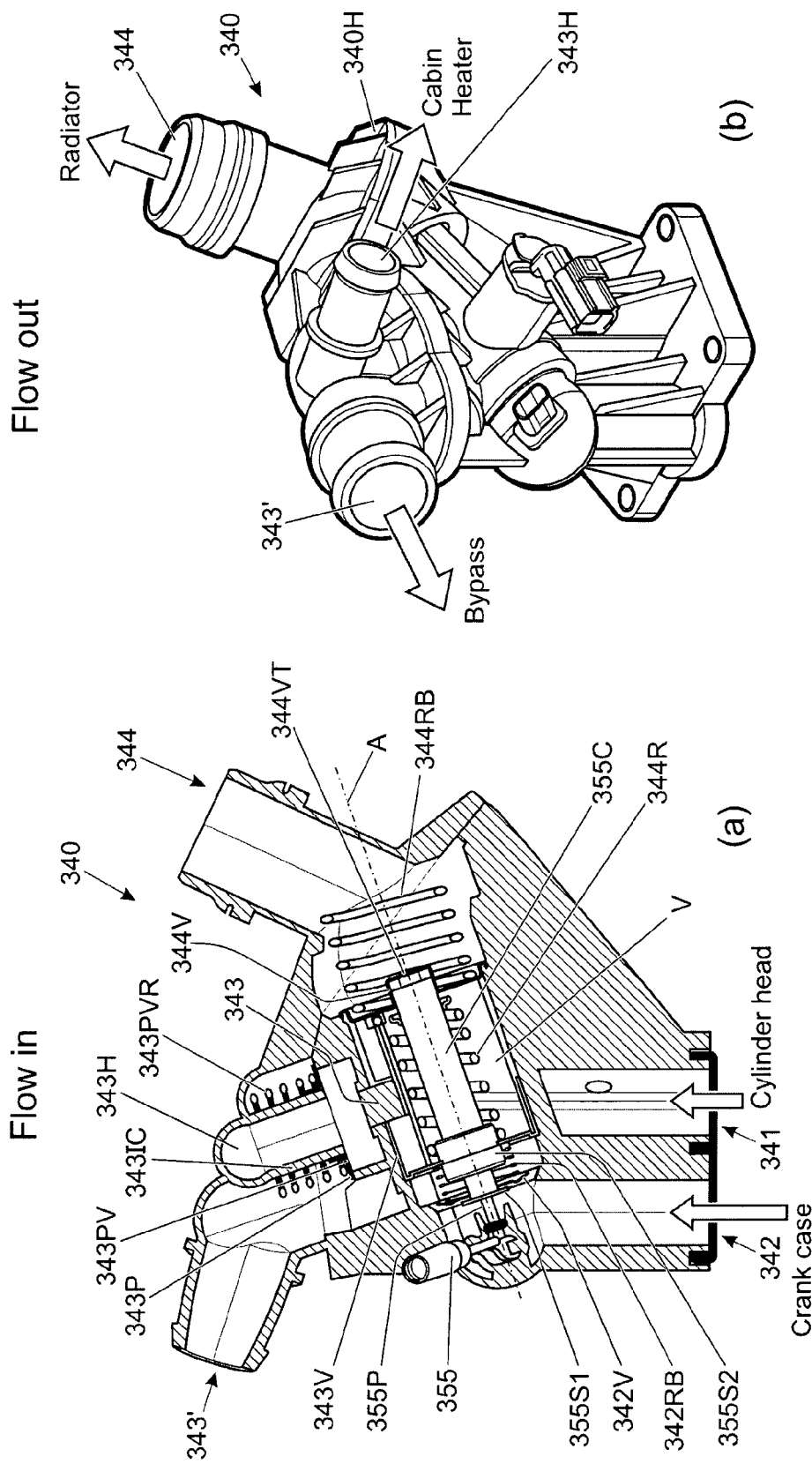
FIG. 9 shows (a) a further cross-sectional view and (b) an external view of the module of the embodiment of FIG. 8.

FIG. 9 shows a more complete view of the IVM 340 of the embodiment of FIG. 8. FIG. 9(a) is a cross-sectional view of the IVM 340 whilst FIG. 9(b) is a 3D view of the IVM 340. It can be seen that fluid passing out from the inner coolant volume V through RBO aperture 343 may pass through a first outlet 343' that is arranged to be coupled to the radiator bypass conduit 228 (FIG. 2) or a second outlet 343H that is arranged to be coupled to the cabin heater heat exchanger 233 (FIG. 2). The RBO valve member 343V is arranged such that when the RBO aperture 343 is closed, a relatively small amount of coolant is permitted to flow past the valve member 343V to the second outlet 343H and thereby to the heat exchanger 233. However an RBO PRV 343P is provided between the RBO aperture 343 and the first outlet 343'. The RBO PRV 343P is arranged to prevent flow of coolant therepast unless the pressure of coolant exceeds a critical value. In the present embodiment, the RBO PRV 343P is arranged to open when a pressure differential of 20-30 kPa is present across the PRV 343P in a direction to cause opening, this pressure corresponding to an engine speed of 1300-1500 rpm in one embodiment. In the embodiment of FIG. 9 the RBO PRV 343P is arranged whereby when the RBO valve member 343V is closed the pressure of coolant flowing through the IVM 340 would be insufficient to cause the valve 343P to open over the range of engine speeds expected under normal operating conditions.

In the embodiment of FIG. 8 and FIG. 9 the RBO PRV 343P has an annular valve member 343PV. The valve member 343PV is provided around an internal conduit 343IC that feeds coolant from the RBO aperture 343 to the second outlet 343H. The valve member 343PV is operable to open against the bias of a resilient spring member 343PVR, allowing coolant to flow from the RBO aperture 343 to the first outlet 343'. The feature of an annular valve member 343PV allows a relatively compact design to be achieved.

Figure 10A:
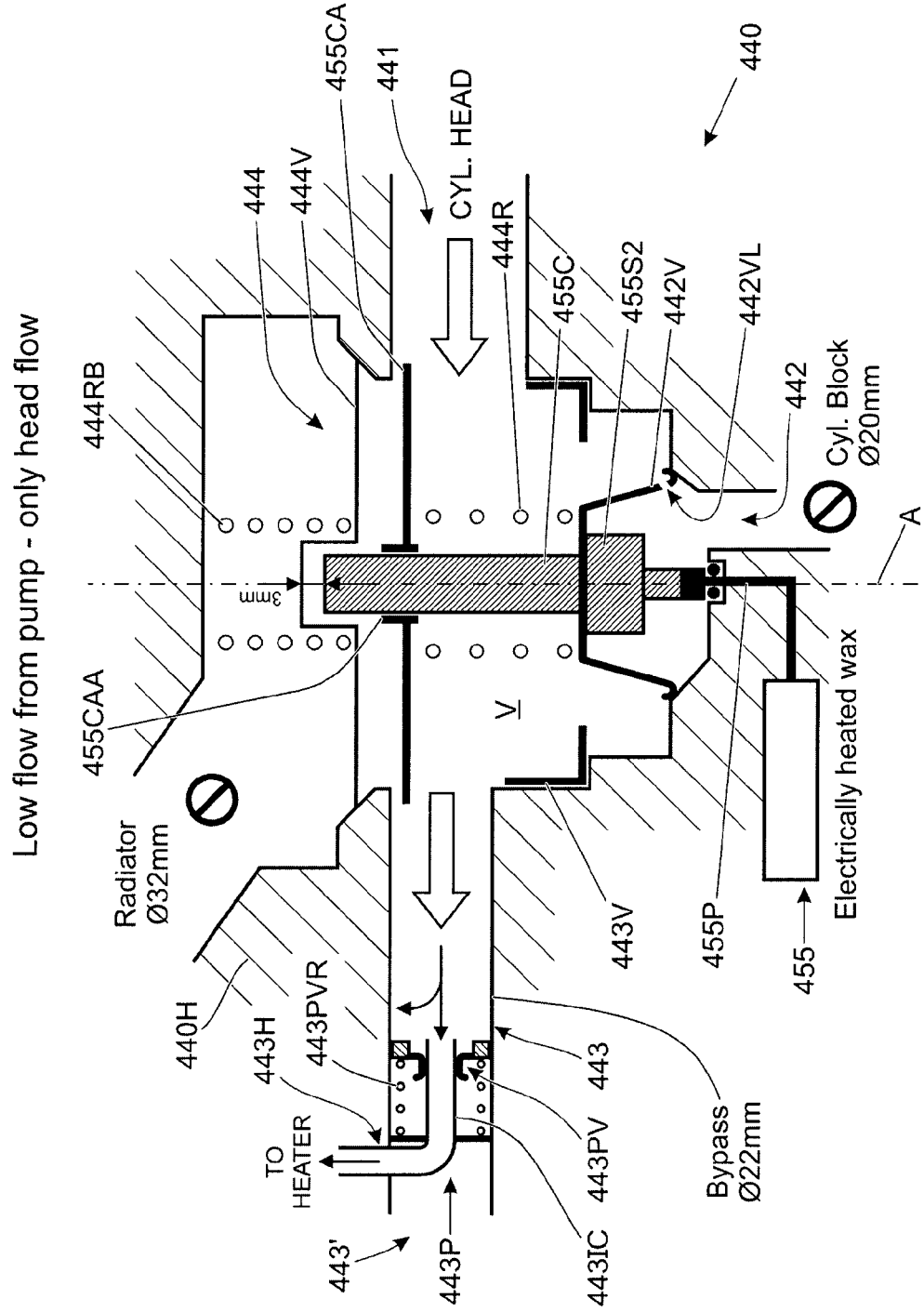
FIG. 10 shows (a) a cross-section view of an integrated valve module according to a further embodiment of the invention, and (b) a perspective view of a portion of the module shown in (a).
Figure 10B:
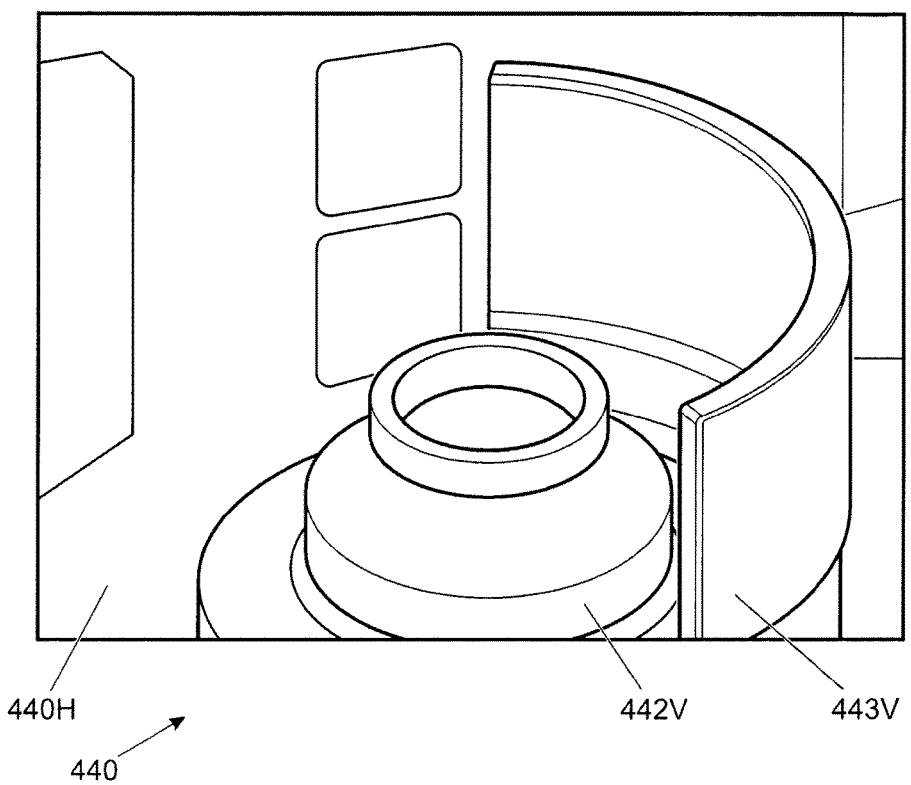

FIG. 10 shows an IVM 440 according to a further embodiment of the invention. Like features of the embodiment of FIG. 10 to those of the embodiment of FIG. 8 are shown with like reference signs prefixed numeral 4 instead of numeral 3. The IVM 440 is configured to operate in a similar manner to that of the embodiment of FIG. 8 except that CBI valve member 442V is not provided with blowpast or 'blow-open' functionality. That is, the CBI valve member 442V does not open in dependence on a pressure difference across the valve member 442V. Rather, the valve member 442V is arranged to open only when a temperature of the wax material within the cylinder 455C exceeds T1.

A leak aperture 442VL is provided through the valve member 442V in order to provide a leak path for coolant within the cylinder block 220B into the IVM 440. In some embodiments a leak path may be provided by a gap or other opening between the valve member 442V and housing 440H. Other arrangements are also useful.

Furthermore, it can be seen that the valve member 442V has a substantially conical shape whereby coolant that has passed through the cylinder block 220B may flow over a portion of the cylinder 455C. In the arrangement shown, around 30% of a surface area of the cylinder 455C that is exposed to coolant is exposed to coolant from the cylinder block 220B that has not yet passed into the inner volume V of the IVM 440. The remaining 70% of the surface area of the cylinder 455C that is exposed to coolant is exposed to coolant in the inner volume V of the IVM 440. This feature enables coolant flowing through the cylinder block 220B to apply a thermal bias to the cylinder 455C and therefore wax within the cylinder, promoting opening of the CBI valve member 442V as the temperature of coolant flowing through the cylinder block 220B increases.

Embodiments of the present invention have the feature that thermal control of an engine may be performed in a more stable manner, reducing a risk of thermal shock to an engine and consequent deterioration in one or more of engine performance and service life. Some embodiments of the present invention have the advantage that control of fluid flowing through two or more portions of an engine 220 such as a cylinder head portion 220H and a cylinder block portion 220B may be performed in synchrony with control of fluid flow through a radiator conduit and a radiator bypass conduit.

Embodiments of the present invention may be understood by reference to the following numbered paragraphs:

1. A fluid flow control device for controlling flow of coolant in a motor vehicle motor cooling system, the flow control device having first and second coolant inlets and first and second coolant outlets, the flow control device being operable selectively to direct coolant flowing into the device to flow out from the flow device through one or both of the first and second outlets in dependence on a temperature of fluid flowing through the device.

2. A device as described in paragraph 1 wherein the flow control device is further operable selectively to allow or to prevent flow of coolant into the device through the second inlet in dependence at least in part on the temperature of the fluid flowing through the device.

3. A device as described in paragraph 1 wherein an outlet valve is provided for selectively directing fluid flowing into the device to flow out from the device through the first outlet only, through both the first and second outlets, or through the second outlet only responsive to the temperature of fluid flowing through the device.

4. A device as described in paragraph 3 wherein the outlet valve comprises a first closure portion operable to close the first outlet and a second closure portion operable to close the second outlet.

5. A device as described in paragraph 4 wherein the outlet valve comprises a closure member, the closure member comprising the first and second closure portions, the device being operable to actuate the closure member between first and second positions, in the first position the closure member being arranged to allow fluid to flow out from the device through the first outlet and not through the second outlet, in the second position the closure member being arranged to allow fluid to flow out from the device through the second outlet and not the first outlet, wherein at a position intermediate the first and second positions the closure member is arranged to allow flow of fluid out from the device through both the first and second outlets.

6. A device as described in paragraph 2 comprising an inlet valve for selectively allowing fluid to flow into the device through the second inlet, the inlet valve being operable between a closed condition in which fluid is prevented from flowing through the inlet valve and an open condition in which fluid is permitted to flow through the inlet valve.

7. A device as described in paragraph 6 wherein an outlet valve is provided for selectively directing fluid flowing into the device to flow out from the device through the first outlet only, through both the first and second outlets, or through the second outlet only responsive to the temperature of fluid flowing through the device, the device being operable wherein when the temperature of fluid flowing through the device is below a first critical temperature the inlet valve is in the closed condition and the outlet valve is in the first condition, the device being operable to actuate the first inlet valve to assume the open condition but to maintain the outlet valve in the first condition when a temperature of fluid flowing through the first inlet exceeds the first critical temperature.

8. A device as described in paragraph 7 operable to control the first and second closure members wherein when the temperature of fluid flowing through the device is greater than the first critical temperature but less than a second critical temperature flow of fluid is permitted through the first and second outlets.

9. A device as described in paragraph 8 wherein the outlet valve comprises a closure member, the closure member comprising the first and second closure portions, the device being operable to actuate the closure member between first and second positions, in the first position the closure member being arranged to allow fluid to flow out from the device through the first outlet and not through the second outlet, in the second position the closure member being arranged to allow fluid to flow out from the device through the second outlet and not the first outlet, wherein at a position intermediate the first and second positions the closure member is arranged to allow flow of fluid out from the device through both the first and second outlets, the device being operable to actuate the closure member to assume an intermediate position when the temperature of fluid flowing through the device is greater than the first critical temperature but less than the second critical temperature thereby to allow flow of fluid through the first and second outlets.

10. A device as described in paragraph 9 operable to actuate the closure member to assume the second position when the temperature of fluid flowing through the device is greater than the second critical temperature.

11. A device as described in paragraph 4 wherein the second closure portion is operable to transition from a closed position in which fluid is prevented from flowing through the second outlet to an open position in which fluid is permitted to flow through the second outlet by translation of the second closure portion in a direction downstream of a flow of fluid through the second outlet.

12. A device as described in paragraph 1 comprising a pressure release portion, the pressure release portion being operable to allow a flow of fluid through the second outlet when a pressure of fluid in the device exceeds a prescribed value.

13. A device as described in paragraph 12 wherein the pressure release portion is operable to control the second closure portion to assume the open condition when the pressure of fluid in the device exceeds the prescribed value.

14. A device as described in paragraph 6 wherein an outlet valve is provided for selectively directing fluid flowing into the device to flow out from the device through the first outlet only, through both the first and second outlets, or through the second outlet only responsive to the temperature of fluid flowing through the device, wherein actuation of the inlet valve and the outlet valve is coordinated by mechanical coupling.

15. A device as described in paragraph 6 operable to actuate the inlet valve by thermal expansion of a first material of the device.

16. A device as described in paragraph 15 wherein an outlet valve is provided for selectively directing fluid flowing into the device to flow out from the device through the first outlet only, through both the first and second outlets, or through the second outlet only responsive to the temperature of fluid flowing through the device, the device being further operable to actuate the outlet valve by thermal expansion of the first material.

17. A device as described in paragraph 15 wherein an outlet valve is provided for selectively directing fluid flowing into the device to flow out from the device through the first outlet only, through both the first and second outlets, or through the second outlet only responsive to the temperature of fluid flowing through the device, the device being further operable to actuate the outlet valve by thermal expansion of a second material of the device.

18. A device as described in paragraph 17 wherein the first material has a melting point lower than that of the second material.

19. A device as described in paragraph 15 operable to heat the first material by means of an electrical heater.

20. A device as described in paragraph 17 operable to heat the second material by means of an electrical heater.

21. A motor vehicle motor cooling system for controlling flow of coolant through a motor of a motor vehicle, the system comprising a fluid flow control device as described in paragraph 1.

22. A motor in combination with a motor cooling system as described in paragraph 21.

23. A motor as described in paragraph 22 wherein the motor is an internal combustion engine, wherein the first inlet of the fluid flow control device is connected to a cylinder head coolant outlet of the engine and the second inlet of the fluid flow control device is coupled to a cylinder block coolant outlet of the engine.

24. A motor as described in paragraph 22 wherein the first outlet of the fluid flow control device is coupled to a radiator bypass conduit and the second outlet is coupled to a radiator conduit, the radiator conduit being arranged to direct fluid to flow through a radiator of the vehicle for cooling the coolant.

25. A motor vehicle comprising a motor as described in paragraph 22.

26. A method of controlling flow of coolant through a motor vehicle motor cooling system by means of a fluid flow control device,
the method comprising selectively directing coolant flowing into the device through one or both of first and second inlets to flow out from the device through one or both of first and second outlets responsive to a temperature of fluid flowing through the device.

27. A method according to paragraph 26 further comprising allowing or preventing flow of coolant into the device through the second inlet responsive to the temperature of fluid flowing through the device.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A fluid flow control device for controlling flow of coolant in a motor vehicle motor cooling system, the flow control device having first and second coolant inlets and first and second coolant outlets, the flow control device being operable selectively to direct coolant flowing into the device to flow out from the flow device through one or both of the first and second outlets, wherein outlet valve means is provided for selectively directing fluid to flow out from the device through the first outlet only, through both the first and second outlets, or through the second outlet only responsive to the temperature of fluid flowing through the device, wherein the outlet valve means comprises an outlet closure member having a first closure portion operable to close the first outlet and a second closure portion operable to close the second outlet, wherein the device is operable to actuate the outlet closure member between first and second positions in dependence on a temperature of fluid flowing through the device, in the first position the outlet closure member being arranged to allow fluid to flow out from the device through the first outlet and not through the second outlet, in the second position the outlet closure member being arranged to allow fluid to flow out from the device through the second outlet and not the first outlet, wherein at a position intermediate the first and second positions the outlet closure member is arranged to allow fluid to flow out from the device through both the first and second outlets, wherein the device comprises inlet valve means for selectively allowing fluid to flow into the device through the second inlet, the inlet valve means being operable between a closed condition in which fluid is prevented from flowing through the inlet valve means by an inlet closure member and an open condition in which fluid is permitted to flow through the inlet valve means, wherein the outlet closure member and the inlet closure member are substantially coaxial with each other.

2. The device as claimed in claim 1, wherein the flow control device is further operable selectively to allow or to prevent flow of coolant into the device through the second inlet in dependence at least in part on the temperature of the fluid flowing through the device.

3. The device as claimed in claim 1, operable wherein when the temperature of fluid flowing through the device is below a first critical temperature the inlet valve means is in the closed condition and the outlet valve means is in a first condition, the device being operable to actuate the inlet valve means to assume the open condition but to maintain the outlet valve means in the first condition when a temperature of fluid flowing through the first inlet exceeds the first critical temperature.

4. The device as claimed in claim 3, operable to control the inlet and outlet closure members wherein when the temperature of fluid flowing through the device is greater than the first critical temperature but less than a second critical temperature flow of fluid is permitted through the first and second outlets.

5. The device as claimed in claim 4, operable to actuate the outlet closure member to assume the intermediate position when the temperature of fluid flowing through the device is greater than the first critical temperature but less than the second critical temperature thereby to allow flow of fluid through the first and second outlets.

6. The device as claimed in claim 5, operable to actuate the outlet closure member to assume the second position when the temperature of fluid flowing through the device is greater than the second critical temperature.

7. The device as claimed in claim 1, wherein the second closure portion is operable to transition from a closed position in which fluid is prevented from flowing through the second outlet to an open position in which fluid is permitted to flow through the second outlet by translation of the second closure portion in a direction downstream of a flow of fluid through the second outlet.

8. The device as claimed in claim 1, comprising pressure release means, the pressure release means being operable to allow a flow of fluid through the second outlet when a pressure of fluid in the device exceeds a prescribed value.

9. The device as claimed in claim 8, wherein the pressure release means is operable to control the second closure portion to assume the open condition when the pressure of fluid in the device exceeds the prescribed value.

10. The device as claimed in claim 1, wherein actuation of the inlet valve means and the outlet valve means is coordinated by mechanical coupling.

11. The device as claimed in claim 1, operable to actuate the inlet valve means by thermal expansion of a first material of the device.

12. The device as claimed in claim 11, further operable to actuate the outlet valve means by thermal expansion of the first material.

13. The device as claimed in claim 11, further operable to actuate the outlet valve means by thermal expansion of a second material of the device.

14. The device as claimed in claim 13, wherein the first material has a melting point lower than that of the second material.

15. A motor vehicle cooling system for controlling flow of coolant through a motor of a motor vehicle, the system comprising a fluid flow control device as claimed in claim 1.

16. A motor vehicle comprising a cooling system as claimed in claim 15.

* * * * *